UNITED STATES PATENT OFFICE.

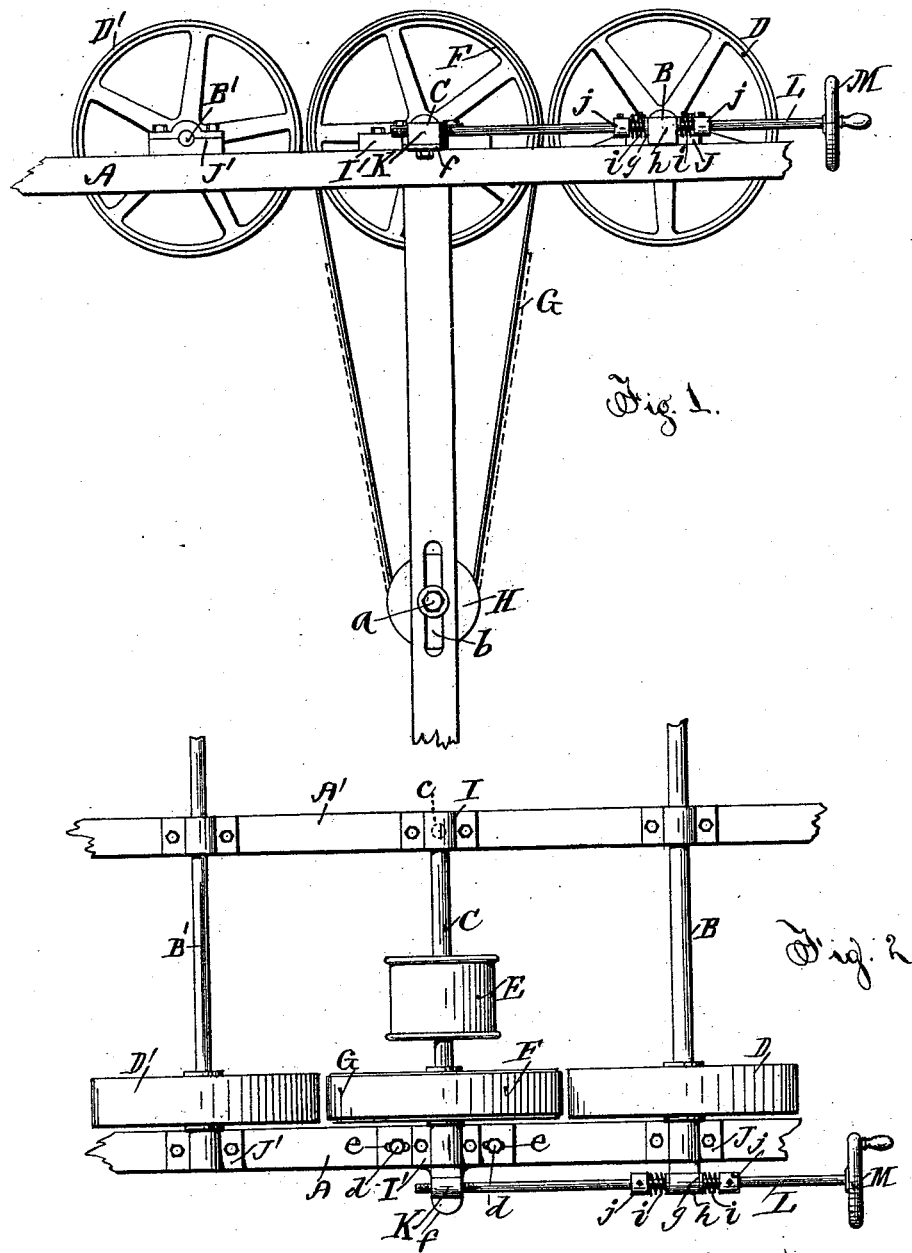

JOSEPH LINTON, OF PAWTUCKET, RHODE ISLAND.

MECHANICAL MOVEMENT.

SPECIFICATION forming part of Letters Patent No. 523,725, dated July 31, 1894.

Application filed April 10, 1894. Serial No. 507,021. (No model.)

*To all whom it may concern:*

Be it known that I, JOSEPH LINTON, a citizen of the United States, residing at Pawtucket, in the State of Rhode Island, have invented an Improvement in Mechanical Movements, of which the following is a specification.

The object of my invention is to provide an efficient device for changing the direction of motion in various machines, and it consists in the improved combination and arrangement of opposite pulleys, and an intermediate pulley and belt, as hereinafter fully set forth.

In the accompanying drawings:—Figure 1, represents a side elevation of the improved mechanical movement. Fig. 2, represents a top view of the same.

In the drawings, A, A', represent portions of the frame of the machine, and B, B', shafts which are to be driven in opposite directions by power derived from the continuously driven shaft C. The shafts B, B', are provided with the pulleys D, D', by means of which the said shafts are driven. The intermediate driving shaft C, is provided with the driving pulley E, and also with the pulley F, which carries the friction belt G, the said belt passing around the tightening wheel H, which turns upon the adjustable stud a, held in the slot b of the frame, and by means of the tightening wheel H the belt G is tightly held against the bearing surface of the pulley F.

The journal box I for the shaft C, is provided with a pivot at c, and the opposite journal box I' is constructed to slide upon the top of the frame A, being held thereon by means of the bolts d, d, passing through the slots e, e. The journal box I' is provided with the projecting lug f, to which is pivoted the nut K adapted to receive the hand screw L, by means of which, the position of the journal box I' may be changed, relatively to the fixed position of the journal boxes J, J', of the shafts B, B'. The hand screw L is also supported in the bearing g, formed in the lug h, which projects from the side of the journal box J, the said screw being provided at its outer end with the hand wheel M, by means of which the screw is operated to move the pulley F so that the friction belt G will be pinched between one or the other of the pulleys D, D', according as it is desired to operate upon the shaft B or B', to drive the parts of the machine connected therewith in the direction required.

A yielding movement may be imparted to the pulley F by means of the springs i, i, which are held between the adjustable collars j, j, and the sides of the lug h, so that upon turning the screw to bring the belt G into contact with either of the pulleys D, D', the belt will be yieldingly held for the proper transmission of power from the pulley F.

By the employment of a belt G, thickened as shown by the dotted lines in Fig. 1, an intermittent rotary motion may be imparted to the pulleys D, D', from the continuous rotary motion of the pulley F, and in this case the rotary motion will be imparted to the pulleys D, D', only when the thickened portion of the belt is passing between the same and the driving pulley F, the pulleys being so arranged relatively to each other as not to pinch the thinner portion of the belt.

The cross section of the friction belt G may be made flat, round, or of any other desirable form, the pulleys being properly grooved to fit the belt, and a suitable cam lever may be employed instead of the screw for operating the intermediate pulley F from side to side, for the engagement of the belt G with the pulleys D, D'.

I claim as my invention—

1. The combination with the shafts B, B', provided with the pulleys D, D', of the movable intermediate shaft C, provided with the pulley F, the friction belt G, the tightening wheel H, for the friction belt and hand operated means for effecting the frictional engagement of the belt G with either of the pulleys D, D', to drive the same, substantially as described.

2. The combination with the shafts B, B', provided with the pulleys D, D', of the movable intermediate shaft C, provided with the pulley F, the friction belt provided with a thickened portion, the tightening wheel H, and hand operated means for effecting the engagement of the belt G with either of the pulleys D, D', to drive the same, substantially as described.

JOSEPH LINTON.

Witnesses:
C. W. TAYLOR,
J. R. STAFFORD.